(12) United States Patent
Abernathy et al.

(10) Patent No.: US 8,037,366 B2
(45) Date of Patent: Oct. 11, 2011

(54) ISSUING INSTRUCTIONS IN-ORDER IN AN OUT-OF-ORDER PROCESSOR USING FALSE DEPENDENCIES

(75) Inventors: Christopher M. Abernathy, Austin, TX (US); Mary D. Brown, Austin, TX (US); Dung Q. Nguyen, Austin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/409,981

(22) Filed: Mar. 24, 2009

(65) Prior Publication Data

US 2010/0251016 A1    Sep. 30, 2010

(51) Int. Cl.
*G06F 11/00*    (2006.01)
(52) U.S. Cl. .......................................... 714/49; 712/219
(58) Field of Classification Search ....................... 714/49
See application file for complete search history.

(56) References Cited

U.S. PATENT DOCUMENTS

| | | | | |
|---|---|---|---|---|
| 5,134,561 A | * | 7/1992 | Liptay | 711/164 |
| 5,487,156 A | * | 1/1996 | Popescu et al. | 712/217 |
| 5,546,597 A | * | 8/1996 | Martell et al. | 712/23 |
| 5,625,789 A | * | 4/1997 | Hesson et al. | 712/217 |
| 5,625,837 A | * | 4/1997 | Popescu et al. | 712/23 |
| 5,745,726 A | * | 4/1998 | Shebanow et al. | 712/216 |
| 5,745,780 A | * | 4/1998 | Phillips et al. | 712/23 |
| 5,748,934 A | * | 5/1998 | Lesartre et al. | 712/216 |
| 5,751,984 A | * | 5/1998 | Chang et al. | 712/216 |
| 5,768,575 A | * | 6/1998 | McFarland et al. | 712/228 |
| 5,812,812 A | * | 9/1998 | Afsar et al. | 712/216 |
| 5,850,533 A | * | 12/1998 | Panwar et al. | 712/216 |
| 5,872,949 A | * | 2/1999 | Kikuta et al. | 712/216 |
| 5,884,061 A | * | 3/1999 | Hesson et al. | 712/217 |
| 5,898,853 A | * | 4/1999 | Panwar et al. | 712/216 |
| 5,941,983 A | * | 8/1999 | Gupta et al. | 712/214 |
| 6,006,326 A | * | 12/1999 | Panwar et al. | 712/217 |
| 6,542,984 B1 | | 4/2003 | Keller et al. | |
| 7,363,467 B2 | * | 4/2008 | Vajapeyam et al. | 712/216 |
| 7,660,971 B2 | * | 2/2010 | Agarwal et al. | 712/217 |
| 7,711,929 B2 | * | 5/2010 | Burky et al. | 712/217 |
| 2006/0184771 A1 | * | 8/2006 | Floyd et al. | 712/218 |
| 2008/0189535 A1 | * | 8/2008 | Agarwal et al. | 712/245 |
| 2009/0063823 A1 | * | 3/2009 | Burky et al. | 712/216 |
| 2009/0063898 A1 | * | 3/2009 | Eisen et al. | 714/12 |
| 2009/0164729 A1 | * | 6/2009 | Robinson | 711/125 |
| 2009/0164734 A1 | * | 6/2009 | Robinson | 711/134 |
| 2009/0254735 A1 | * | 10/2009 | Col et al. | 712/208 |

\* cited by examiner

*Primary Examiner* — Scott Baderman
*Assistant Examiner* — Kamini Patel
(74) *Attorney, Agent, or Firm* — Francis Lammos; Stephen J. Walder, Jr.; Diana R. Gerhardt

(57) ABSTRACT

A mechanism is provided for issuing instructions. An instruction dispatch unit receives an instruction for dispatch to one of a plurality of execution units. The instruction dispatch unit analyzes a tag register to determine whether a previous tag associated with a previous instruction has been stored in the tag register. Responsive to the previous tag associated with the previous instruction failing to be stored in the tag register, the instruction dispatch unit storing a tag corresponding to the instruction in the tag register. The instruction dispatch unit dispatches the instruction to an issue queue for issue to the one of the plurality of execution units.

17 Claims, 5 Drawing Sheets

ISSUING INSTRUCTIONS IN-ORDER IN AN OUT-OF-ORDER PROCESSOR USING FALSE DEPENDENCIES

This invention was made with United States Government support under Agreement No. HR0011-07-9-0002 awarded by DARPA. The Government has certain rights in the invention.

BACKGROUND

The present application relates generally to an improved data processing apparatus and method and more specifically to an apparatus and method for issuing instructions in-order in an out-of-order processor using false dependencies.

A microprocessor is the heart of a modern computer, a chip made up of millions of transistors and other elements organized into specific functional operating units, including arithmetic units, cache memory and memory management, predictive logic, and data movement. Processors in modern computers have grown tremendously in performance, capabilities, and complexity over the past decade. Any computer program consists of many instructions for operating on data. Processors may be categorized as in-order processors or out-of-order processors.

In-order processors normally process instructions by fetching the instruction, if input operands are available (in registers for instance), dispatching the instruction to the appropriate functional unit or, if one or more operands are unavailable during the current clock cycle (generally because they are being fetched from memory), the processor stalls until they are available, executing the instruction by the appropriate functional unit, and writing the results back to a register file. Out-of-order processors normally process instructions by fetching the instruction, dispatching the instruction to an instruction queue, waiting for operand to be available before issuing the instruction to the appropriate functional unit, executing the instruction by the appropriate functional unit, queuing the results, and only after all older instructions have their results written back to the register file, then this result is written back to the register file. The key concept of out-of-order processing is to allow the processor to avoid a class of stalls that occur when the data needed to perform an operation are unavailable.

SUMMARY

In one illustrative embodiment, a method, in a data processing system, is provided for issuing instructions. The illustrative embodiment receives an instruction for dispatch to one of a plurality of execution units. The illustrative embodiment analyzes a tag register to determine whether a previous tag associated with a previous instruction has been stored in the tag register. The illustrative embodiment stores a tag corresponding to the instruction in the tag register in response to the previous tag associated with the previous instruction failing to be stored in the tag register. The illustrative embodiment dispatches the instruction to an issue queue for issue to the one of the plurality of execution units.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
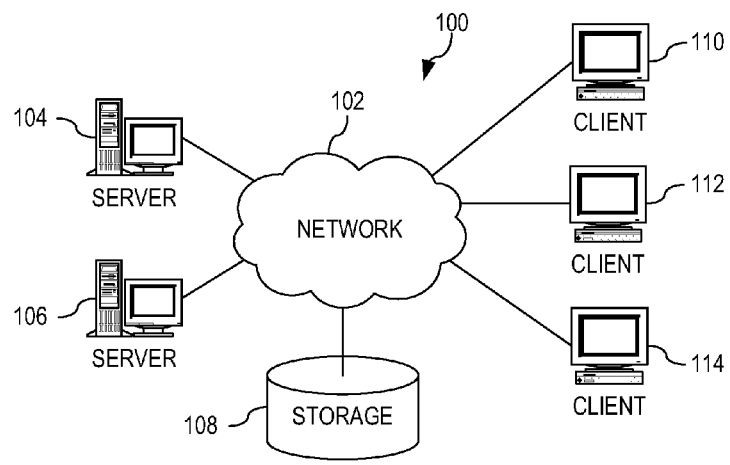
FIG. 1 depicts a pictorial representation of an example distributed data processing system in which aspects of the illustrative embodiments may be implemented.

The illustrative embodiments provide a mechanism for providing a mode for out-of-order processors to issue instructions in-order, with little overhead, and without severely crippling performance. Issuing instructions in-order in an out-of-order processor may be useful for a power-reduction mode (to minimize out-of-order misspeculation which consumes power), for a debug mode, for a workaround mode (to temporarily avoid scenarios which lead to hardware bugs), or the like. Known solutions include single-stepping the instructions, which only allows one instruction at a time to dispatch, issue, execute, and complete, before proceeding with dispatching the next instruction, or serializing instructions, which only allows one instruction at a time to issue, execute, and complete, before proceeding with issuing the next instruction. Although incurring very little overhead, these single-step and serializing modes severely impact performance.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
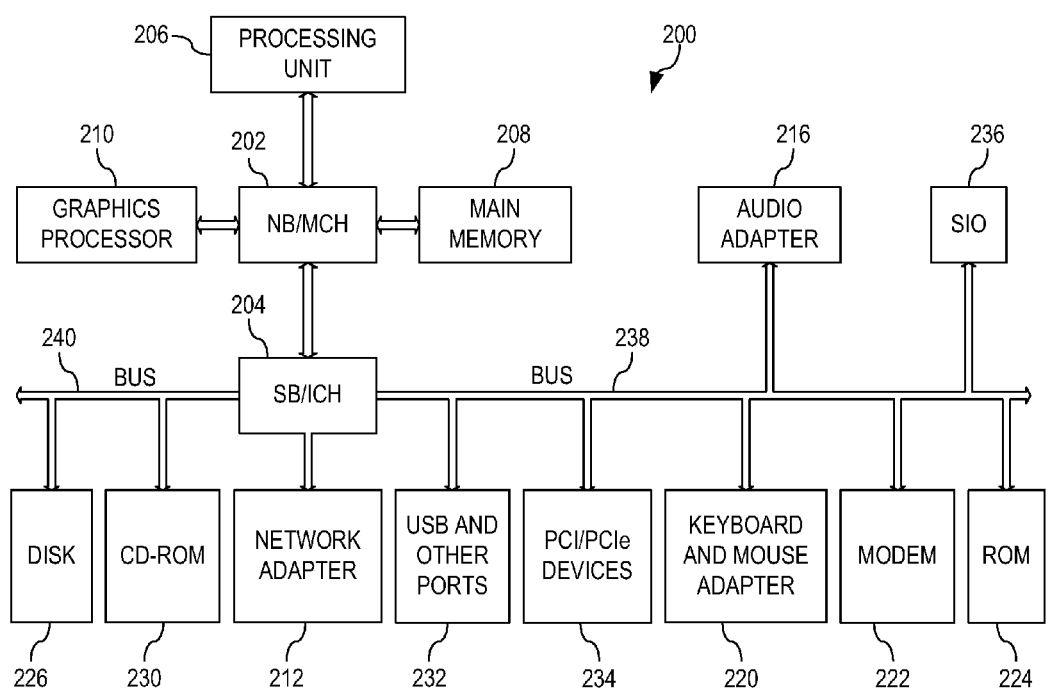
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for issuing instructions in-order in an out-of-order processor using false dependencies, this is only an example and is not intended to state or imply any limitation with regard to the features of the present invention. To the contrary, the illustrative embodiments are intended to include distributed data processing environments and embodiments in which instructions are issued instruction in-order in an out-of-order processor using false dependencies.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
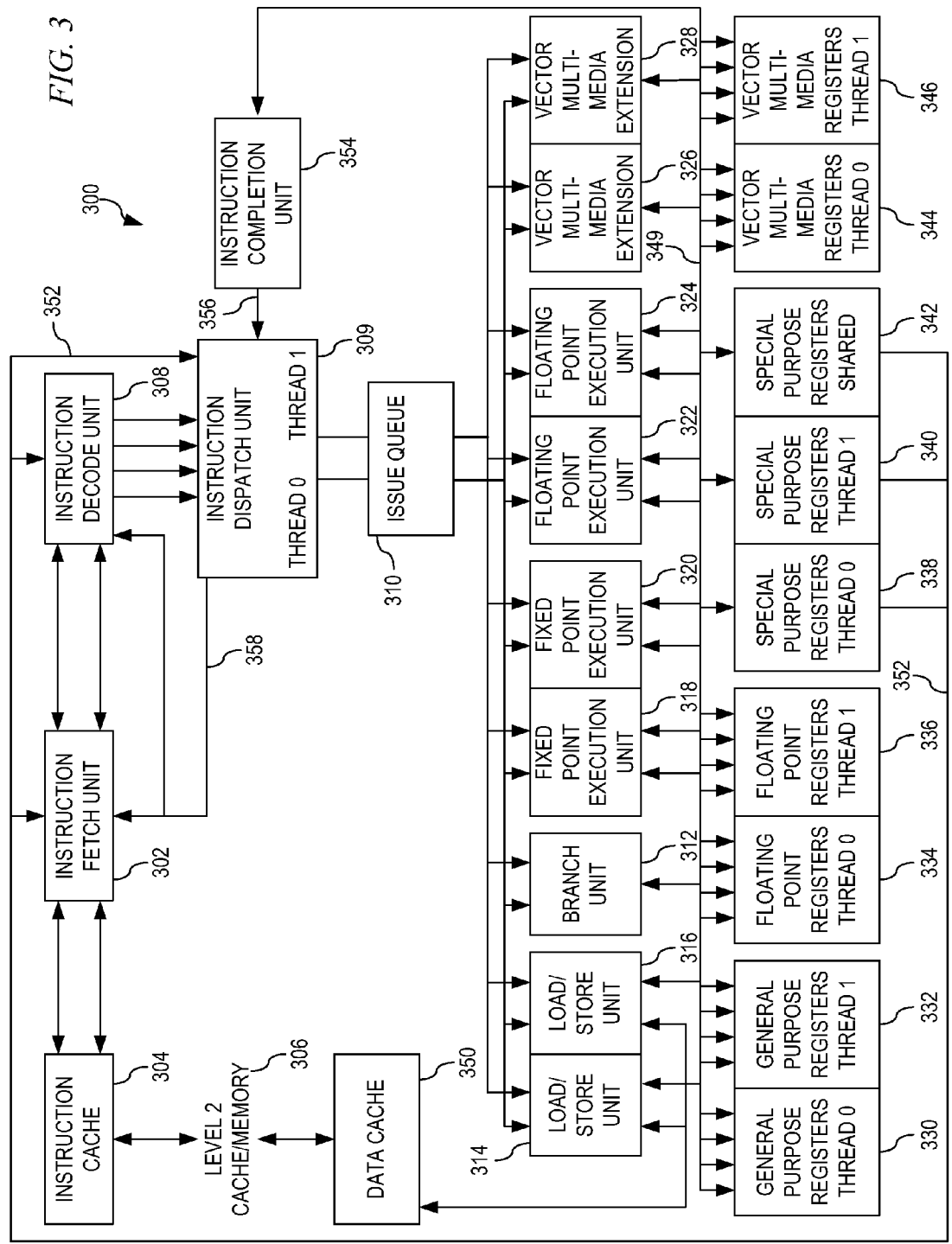
FIG. 3 depicts an exemplary block diagram of a conventional dual threaded processor design showing functional units and registers in accordance with an illustrative embodiment.

Referring to FIG. 3, an exemplary block diagram of a conventional dual threaded processor design showing functional units and registers is depicted in accordance with an illustrative embodiment. Processor 300 may be implemented as processing unit 206 in FIG. 2 in these illustrative examples. Processor 300 comprises a single integrated circuit superscalar microprocessor with dual-thread simultaneous multithreading (SMT) that may also be operated in a single threaded mode. Accordingly, as discussed further herein below, processor 300 includes various units, registers, buffers, memories, and other sections, all of which are formed by integrated circuitry. Also, in an illustrative embodiment, processor 300 operates according to reduced instruction set computer (RISC) techniques.

As shown in FIG. 3, instruction fetch unit (IFU) 302 connects to instruction cache 304. Instruction cache 304 holds instructions for multiple programs (threads) to be executed. Instruction cache 304 also has an interface to level 2 (L2) cache/memory 306. IFU 302 requests instructions from instruction cache 304 according to an instruction address, and passes instructions to instruction decode unit 308. In an illustrative embodiment, IFU 302 may request multiple instructions from instruction cache 304 for up to two threads at the same time. Instruction decode unit 308 decodes multiple instructions for up to two threads at the same time and passes decoded instructions to instruction dispatch unit (IDU) 309.

Processor 300 may also include issue queue 310, which receives decoded instructions from IDU 309. Instructions are stored in the issue queue 310 while awaiting dispatch to the appropriate execution units. For an out-of order processor to operate in an in-order manner, IDU 309 may selectively issue instructions quickly using false dependencies between each instruction. If the instruction does not produce data, such as in a read after write dependency, IDU 309 may add an additional source operand (also referred to as a consumer) per instruction to point to the previous target instruction (also referred to as a producer). Issue queue 310, when issuing the producer, may then wakeup the consumer for issue. By introducing false dependencies, a chain of dependent instructions may then be created, whereas the instructions may then be issued only in-order. IDU 309 uses the added consumer for instruction scheduling purposes and the instructions, when executed, do not actually use the data from the added dependency. Once IDU 309 selectively adds any required false dependencies, then issue queue 310 takes over and issues the instructions in order for each thread, and outputs or issues instructions for each thread to execution units 312, 314, 316, 318, 320, 322, 324, 326, and 328 of the processor. This process will be described in more detail in the following description.

In an illustrative embodiment, the execution units of the processor may include branch unit 312, load/store units (LSUA) 314 and (LSUB) 316, fixed point execution units (FXUA) 318 and (FXUB) 320, floating point execution units (FPUA) 322 and (FPUB) 324, and vector multimedia extension units (VMXA) 326 and (VMXB) 328. Execution units 312, 314, 316, 318, 320, 322, 324, 326, and 328 are fully shared across both threads, meaning that execution units 312, 314, 316, 318, 320, 322, 324, 326, and 328 may receive instructions from either or both threads. The processor includes multiple register sets 330, 332, 334, 336, 338, 340, 342, 344, and 346, which may also be referred to as architected register files (ARFs).

An ARF is a file where completed data is stored once an instruction has completed execution. ARFs 330, 332, 334, 336, 338, 340, 342, 344, and 346 may store data separately for each of the two threads and by the type of instruction, namely general purpose registers (GPRs) 330 and 332, floating point registers (FPRs) 334 and 336, special purpose registers (SPRs) 338 and 340, and vector registers (VRs) 344 and 346. Separately storing completed data by type and by thread assists in reducing processor contention while processing instructions.

The processor additionally includes a set of shared special purpose registers (SPR) 342 for holding program states, such as an instruction pointer, stack pointer, or processor status word, which may be used on instructions from either or both threads. Execution units 312, 314, 316, 318, 320, 322, 324, 326, and 328 are connected to ARFs 330, 332, 334, 336, 338, 340, 342, 344, and 346 through simplified internal bus structure 349.

In order to execute a floating point instruction, FPUA 322 and FPUB 324 retrieves register source operand information, which is input data required to execute an instruction, from FPRs 334 and 336, if the instruction data required to execute the instruction is complete or if the data has passed the point of flushing in the pipeline. Complete data is data that has been generated by an execution unit once an instruction has completed execution and is stored in an ARF, such as ARFs 330, 332, 334, 336, 338, 340, 342, 344, and 346. Incomplete data is data that has been generated during instruction execution where the instruction has not completed execution. FPUA 322 and FPUB 324 input their data according to which thread each executing instruction belongs to. For example, FPUA 322 inputs completed data to FPR 334 and FPUB 324 inputs completed data to FPR 336, because FPUA 322, FPUB 324, and FPRs 334 and 336 are thread specific.

During execution of an instruction, FPUA 322 and FPUB 324 output their destination register operand data, or instruction data generated during execution of the instruction, to FPRs 334 and 336 when the instruction has passed the point of flushing in the pipeline. During execution of an instruction, FXUA 318, FXUB 320, LSUA 314, and LSUB 316 output their destination register operand data, or instruction data generated during execution of the instruction, to GPRs 330 and 332 when the instruction has passed the point of flushing in the pipeline. During execution of a subset of instructions, FXUA 318, FXUB 320, and branch unit 312 output their destination register operand data to SPRs 338, 340, and 342 when the instruction has passed the point of flushing in the pipeline. Program states, such as an instruction pointer, stack pointer, or processor status word, stored in SPRs 338 and 340 indicate thread priority 352 to IDU 309. During execution of an instruction, VMXA 326 and VMXB 328 output their destination register operand data to VRs 344 and 346 when the instruction has passed the point of flushing in the pipeline.

Data cache 350 may also have associated with it a non-cacheable unit (not shown) which accepts data from the processor and writes it directly to level 2 cache/memory 306. In this way, the non-cacheable unit bypasses the coherency protocols required for storage to cache.

In response to the instructions input from instruction cache 304 and decoded by instruction decode unit 308, IDU 309 selectively dispatches the instructions to issue queue 310 and then onto execution units 312, 314, 316, 318, 320, 322, 324, 326, and 328 with regard to instruction type and thread. In turn, execution units 312, 314, 316, 318, 320, 322, 324, 326, and 328 execute one or more instructions of a particular class or type of instructions. For example, FXUA 318 and FXUB 320 execute fixed point mathematical operations on register source operands, such as addition, subtraction, ANDing, ORing and XORing. FPUA 322 and FPUB 324 execute floating point mathematical operations on register source operands, such as floating point multiplication and division. LSUA 314 and LSUB 316 execute load and store instructions, which move operand data between data cache 350 and ARFs 330, 332, 334, and 336. VMXA 326 and VMXB 328 execute single instruction operations that include multiple data. Branch unit 312 executes branch instructions which conditionally alter the flow of execution through a program by modifying the instruction address used by IFU 302 to request instructions from instruction cache 304.

Instruction completion unit 354 monitors internal bus structure 349 to determine when instructions executing in execution units 312, 314, 316, 318, 320, 322, 324, 326, and 328 are finished writing their operand results to ARFs 330, 332, 334, 336, 338, 340, 342, 344, and 346. Instructions executed by branch unit 312, FXUA 318, FXUB 320, LSUA 314, and LSUB 316 require the same number of cycles to execute, while instructions executed by FPUA 322, FPUB 324, VMXA 326, and VMXB 328 require a variable, and a larger number of cycles to execute. Therefore, instructions that are grouped together and start executing at the same time do not necessarily finish executing at the same time. "Completion" of an instruction means that the instruction is finishing executing in one of execution units 312, 314, 316, 318, 320, 322, 324, 326, or 328, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 354 monitors for the completion of instructions, and sends control information 356 to IDU 309 to notify IDU 309 that more groups of instructions can be dispatched to execution units 312, 314, 316, 318, 320, 322, 324, 326, and 328. IDU 309 sends dispatch signal 358, which serves as a throttle to bring more instructions down the pipeline to the dispatch unit, to IFU 302 and instruction decode unit 308 to indicate that it is ready to receive more decoded instructions.

Figure 4:
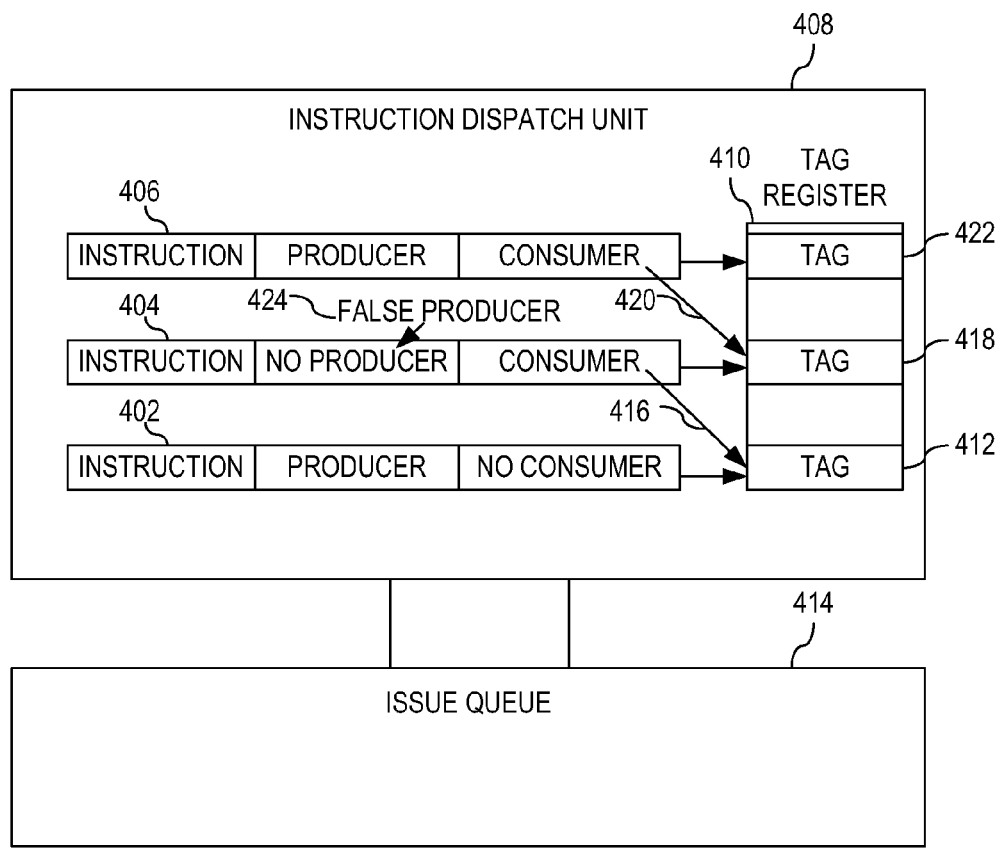
FIG. 4 depicts an exemplary block diagram of issuing instructions in-order in an out-of-order processor using false dependencies in accordance with an illustrative embodiment.

FIG. 4 depicts an exemplary block diagram of issuing instructions in-order in an out-of-order processor using false dependencies in accordance with an illustrative embodiment. In this illustrative embodiment, instruction dispatch unit (IDU) 408 and issue queue 414 may be comprised within a processing device, such as data processing system 200 of FIG. 2 or processor 300 of FIG. 3. As IDU 408 dispatches instructions 402, 404, and 406, such as IDU 309 in processor 300 of FIG. 3, IDU 408 determines if instructions 402, 404, and 406 are a first instruction or a subsequent instruction by analyzing tag register 410 to determine if a previous tag associated with a previous instruction has been stored. If IDU 408 determines a previous tag associated with a previous instruction has not been stored in tag register 410, then IDU 408 stores off tag 412 corresponding to instruction 402, identified as a first instruction, in tag register 410. Tag 412 may be a physical register address tag (RTAG), a logical register address tag (LREG), an issue queue position tag (QPOS), or the like. A RTAG may be used if issue queue 414 uses RTAGs to wake up dependent instructions. A LREG may be used, which may then be used to look up the register renamer to access the corresponding RTAG. LREG may also used if the issue queue uses RTAGs to wake up dependent instructions. A QPOS may be used, if the issue queue uses QPOSs to wake up dependent instructions.

For instruction 404, IDU 408 will then determine previous tag 412 associated with an instruction 402 stored in tag register 410. IDU 408 then injects consumer 416 into instruction 404 that points to tag 412 corresponding to instruction 402. When IDU 408 prepares instruction 404 for dispatch, IDU 408 determines if instruction 404 produces data. If instruction 404 produces data, then IDU 408 stores off tag 418 corresponding to instruction 404 in tag register 410 and issues instruction 404 to issue queue 414. If, as indicated, instruction 404 fails to produce data, then IDU 408 injects a false producer 424 into instruction 404, stores off tag 418 corresponding to instruction 404 in tag register 410, and issues instruction 404 to issue queue 414. IDU 408 then continues to process subsequent instructions in a similar manner. That is, IDU 408 then injects consumer 420 into instruction 406 that points to tag 418 corresponding to instruction 404, stores off tag 422 corresponding to instruction 406 in tag register 410, and issues instruction 406 to issue queue 414. Thus, IDU 408 uses tags in tag register 410 to identify whether an instruction is a first instruction or a subsequent instruction and adds a consumer to subsequent instructions that points to the last instruction's tag.

Additionally, some of instructions 402, 404, and 406 may not produce data, and, therefore, IDU 408 provides additional handling beyond adding an additional consumer per instruction. IDU 408 may introduce false producers for instructions with no producers except for the first instruction whether or not the first instruction produces data. That is, data is not actually produced for these instructions, but a producer is added for scheduling purposes. For instructions that do not produce data:

An RTAG may still be allocated for instructions that have no producers, so that the next instruction may be scheduled to issue. There is no real data used for an RTAG though;

An LREG may still be allocated for instructions that have no producers, so that the next instruction may be scheduled to issue. However, the LREG has to be a value that is not visible to the architecture, otherwise unwanted dependencies will be created. For example, if an architecture specifies a logical address range of 0-31, then a value of 32 can be used for this in-order scheduling mechanism; or A QPOS may still be allocated for instructions that have no producers, since they still occupy an issue queue position.

In this example, instruction 404 does not produce data. Therefore, IDU 408 injects false producer 424 into instruction 404 before instruction 404 is sent to issue queue 414 for issue to one of a plurality of execution units.

When a processor has to flush instructions from the pipeline, the false dependencies provided by false producers injected by IDU 408 may become incorrect, since the false producers may be pointing to instructions that are now flushed. So, IDU 408 provides another process to handle flushes. When a flush occurs in the pipeline of the processor and IDU 408 dispatches the first instruction after the flush, issue queue 414 waits for all older instructions to issue. By waiting for all older instructions to issue, newly dispatched instructions after the flush will issue in-order. Again, no injection of a false dependency is needed for the first instruction dispatched after the flush. This process provided by IDU 408 may not incur much of a performance penalty, since flushes are usually rare in microprocessors and the pipeline is usually cleared by the time the re-dispatch occurs after the flush.

The illustrative embodiment may further be refined to allow in-order instruction issue based on a given type of instruction, a given type of register, or a given issue queue. Additionally, further qualification may be used to selectively introduce the additional consumer dependency previously described. For example, if it is desired to force in-order issue for instructions that operate on GPR registers only, the producers' tags only need to be tracked for GPR producers, and carried on to the added consumer for instructions that read GPR registers. As another example, if it is desired to force in-order issue for only one issue queue in a processor that may employ multiple issue queues, then the producers' tags only need to be tracked for producers sent to that particular issue queue and carried on to the added consumer for instructions that are also sent to that particular issue queue.

In another embodiment, a mechanism of tracking consumer tags and carrying them on to added consumers may be triggered on and off dynamically. As mentioned before, this mechanism may be triggered on for power savings if the processor is running above a predetermined thermal threshold or on battery power. In addition, the mechanism may be triggered to avoid known hardware bugs that may be avoided by issuing instructions in-order. Triggering the processor to operate in an in-order manner may be performed by software or hardware.

Figure 5:
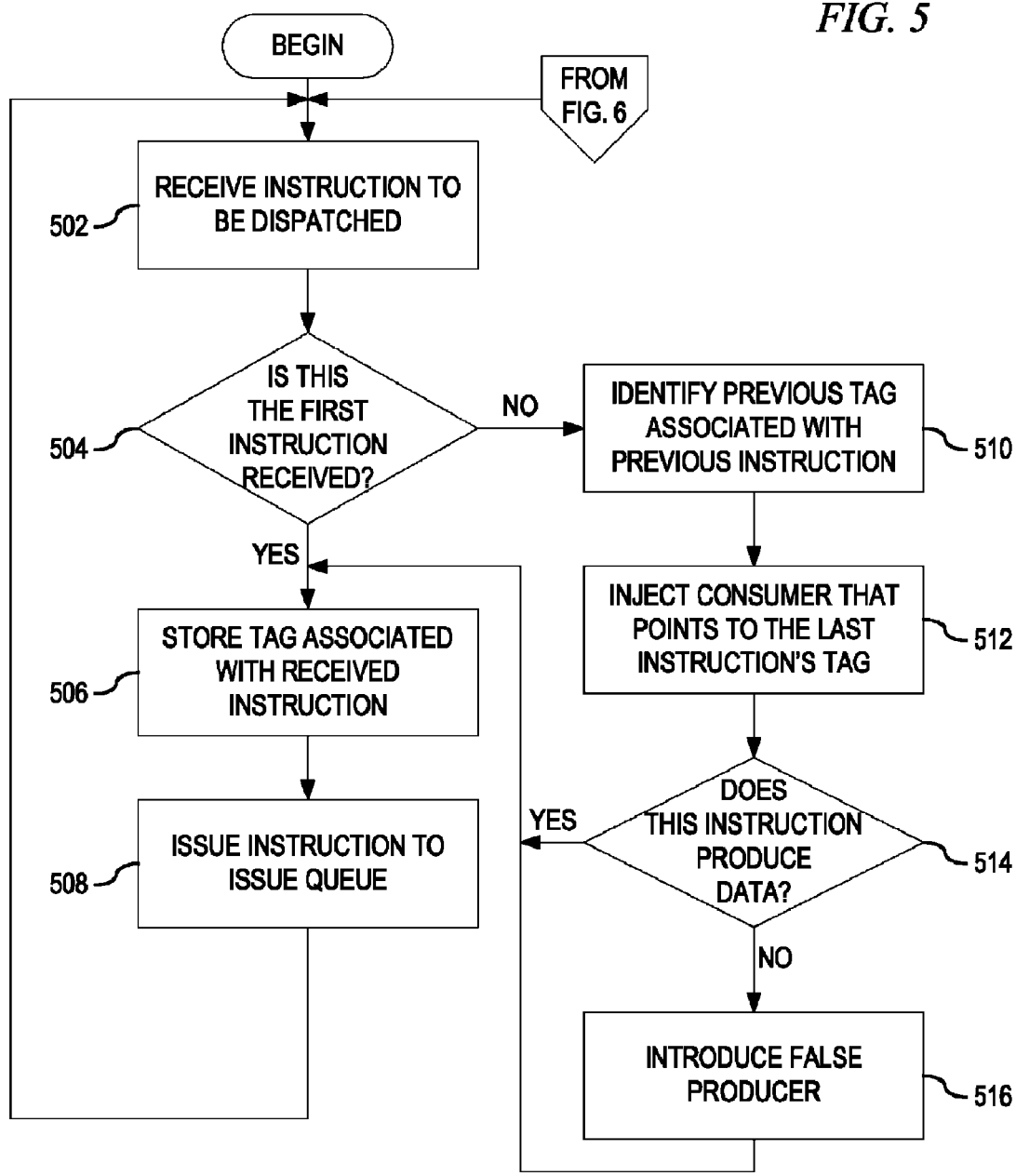
FIG. 5 depicts a flowchart for the operation performed in issuing instructions in-order in an out-of-order processor using false dependencies in accordance with an illustrative embodiment.

FIG. 5 depicts a flowchart for the operation performed in issuing instructions in-order in an out-of-order processor using false dependencies in accordance with an illustrative embodiment. As the operation begins, an instruction dispatch unit (IDU) receives an instruction for dispatch to one of a plurality of execution units (step 502). The IDU determines if the instruction is a first instruction by analyzing a tag register to determine if a previous tag associated with a previous instruction has been stored (step 504). If at step 504 the IDU determines that the instruction is a first instruction, then the IDU stores off a tag corresponding to the instruction in the tag register (step 506). Then the IDU dispatches the instruction to the issue queue for issue to one of the plurality of execution units (step 508), with the operation returning to step 502 thereafter.

If at step 504 the IDU determines that the instruction is not a first instruction, the IDU will then identify a previous tag associated with a previous instruction stored in tag register (step 510). The IDU then injects a consumer into the instruction that points to the identified tag corresponding to the previous instruction (step 512). The IDU determines if the instruction produces data (step 514). If at step 514 the instruction produces data, then the operation proceeds to step 506. If at step 514 the instruction fails to produce data, then the IDU injects a false producer into the instruction (step 516), with the operation proceeding to step 506 thereafter.

Figure 6:
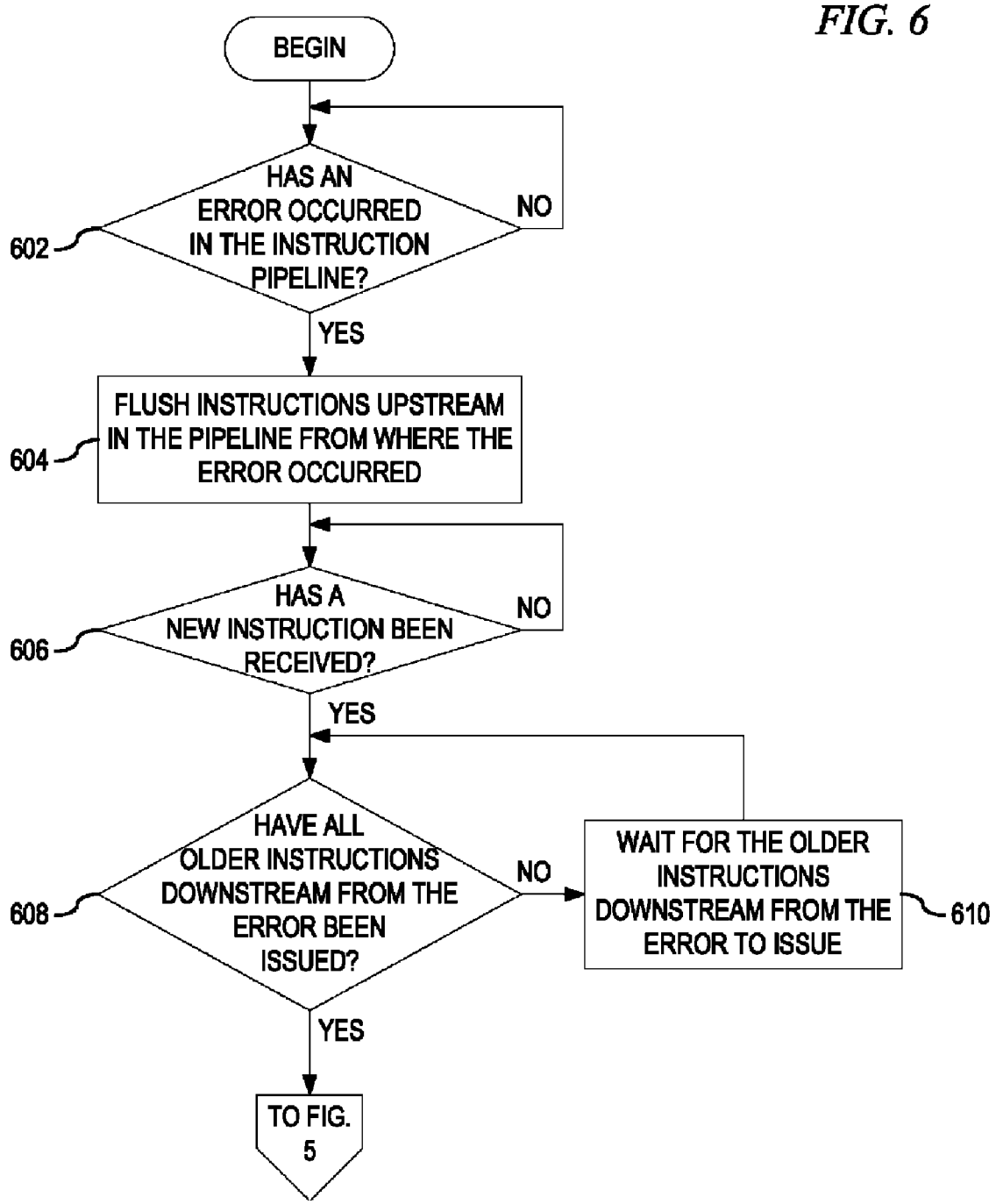
FIG. 6 depicts a flowchart for the operation performed in issuing instructions in-order after a flush in an out-of-order processor using false dependencies in accordance with an illustrative embodiment.

FIG. 6 depicts a flowchart for the operation performed in issuing instructions in-order after a flush in an out-of-order processor using false dependencies in accordance with an illustrative embodiment. As the operation begins, the processor determines whether an error has occurred in an instruction pipeline (step 602). If at step 602 an error has not occurred, the operation returns to step 602. If at step 602 an error has occurred, then the processor flushes all instructions upstream in the pipeline from the point where the error occurred (step 604). The instruction dispatch unit (IDU) within the processor determines if a new instruction has been received (step 606). If at step 606 a new instruction has not been received, then the operation returns to step 606. If at step 606 a new instruction has been received, then the IDU determines if all older instructions downstream from the error have been issued (step 608). If at step 608 all older instructions have not been issued, then the IDU waits for the older instructions downstream from the error to issue (step 610), with the operation returning to step 608 thereafter. If at step 608 all older instructions have issued, then the operation proceeds to step 502 in FIG. 5 thereafter.

Thus, the illustrative embodiments provide mechanisms for introducing false dependencies between each instruction, and allow mechanisms within the processor to ensure that instructions are issued in-order. An additional source operand (or consumer) may be added, per instruction, to point to the previous target (or producer); the issue queue, when issuing the producer, may then wakeup the consumer for issue. A chain of dependent instructions may then be created and the instructions may then be issued in-order. The added consumer is just for instruction scheduling purposes. That is, the instructions, when executed, do not actually use the data from the added dependency.

The advantage of this solution over single-stepping and serializing is that this solution allows instructions to be dispatched at maximum bandwidth capacity and issued at a greater frequency. In the illustrative embodiments, the next instruction may be issued when the previous instruction is producing its data. In single-stepping mode, the next instruction can not be dispatched until the previous instruction is completed. In serializing mode, the next instruction can not be issued until the previous instruction is completed. So, the windows between issuing instructions is much larger in single-stepping and serializing modes and, therefore, slower performing than the described illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processing device, for issuing instructions in-order in an out-of-order Processor, the method comprising:
   receiving, by an instruction dispatch unit, an instruction for dispatch to one of a plurality of execution units in the processing device;
   analyzing, by the instruction dispatch unit, a tag register to determine whether a previous tag associated with a previous instruction has been stored in the tag register;
   responsive to the previous tag associated with the previous instruction existing in the tag register injecting by the instruction dispatch unit, a consumer into the instruction that points to the previous tag corresponding to the previous instruction;
   determining by the instruction dispatch unit, whether the instruction produces data;
   responsive to the instruction failing to produce data injecting by the instruction dispatch unit, a false producer into the instruction wherein the false producer is added for scheduling of instructions in-order in the out-of-order processor;
   storing by the instruction dispatch unit, a tag corresponding to the instruction in the tag register; and
   dispatching, by the instruction dispatch unit, the instruction to an issue queue for issue to the one of the plurality of execution units.

2. The method of claim 1, further comprising:
   determining, by the out-of-order processor, whether an error has occurred in an instruction pipeline of the processing device;
   responsive to an error occurring in the instruction pipeline, flushing, by the out-of-order processor, a set of instructions upstream in the instruction pipeline from a point where the error occurred;
   determining, by an instruction dispatch unit, whether a new instruction has been received in the processing device;
   responsive to the new instruction being received, determining, by the instruction dispatch unit, whether a. set of older instructions downstream from the point where the error occurred have issued; and
   responsive to the set of older instructions failing to have issued, waiting, by the instruction dispatch unit for the set of older instructions downstream from the point where the error occurred to issue.

3. The method of claim 2, further comprising:
   responsive to the set of older instructions downstream from the point where the error occurred issuing, proceeding, by the instruction dispatch unit, to process the new instruction starting with analyzing the new instruction and the tag register to determine whether the previous tag associated with the previous instruction has been stored in the tag register.

4. The method of claim 1, wherein the instruction is analyzed based upon at least one of a predetermined type of instruction, a predetermined type of register on which the instruction operates, or a predetermined issue queue that the instruction is to be issued from when the processing device employs multiple issue queues.

5. The method of claim 1, wherein the instruction is analyzed based on a status of a trigger in the processing device.

6. The method of claim 5, wherein the trigger is activated based on at least one of whether the processing device is running above a predetermined thermal threshold, whether the processing device is running on battery power, or whether the processing device is avoiding known hardware bugs that may be avoided by issuing instructions in-order.

7. The method of claim 1, further comprising:
   responsive to the previous tag associated with the previous instruction failing to be stored in the tag register, storing, by the instruction dispatch unit, a tag corresponding to the instruction in the tag register; and
   dispatching, by the instruction dispatch unit, the instruction to an issue queue for issue to the one of the plurality of execution units.

8. A computer program product comprising a computer-readable storage medium having a computer readable program recorded thereon, wherein the computer readable program, when executed on a computing device, causes the computing device to:
   receive an instruction for dispatch to one of a plurality of execution units;
   analyze a tag register to determine whether a previous tag associated with a previous instruction has been stored in the tag register;
   responsive to the previous tag associated with the previous instruction existing in the tag register, inject a consumer into the instruction that points to the previous tag corresponding to the previous instruction;
   determine whether the instruction produces data;
   responsive to the instruction failing to produce data, inject a false producer into the instruction, wherein the false producer is added for scheduling of instructions in-order in a out-of-order processor;
   store a tag corresponding to the instruction in the tag register; and
   dispatch the instruction to an issue queue for issue to the one of the plurality of execution units.

9. The computer program product of claim 8, wherein the computer readable program further causes the computing device to:
   determine whether an error has occurred in an instruction pipeline of the computer program product;
   responsive to an error occurring in the instruction pipeline, flush a set of instructions upstream in the instruction pipeline from a point where the error occurred;
   determine whether a new instruction has been received in the computer program product;
   responsive to the new instruction being received, determine whether a set of older instructions downstream from the point where the error occurred have issued; and
   responsive to the set of older instructions failing to have issued, wait for the set of older instructions downstream from the point where the error occurred to issue.

10. The computer program product of claim 9, wherein the computer readable program further causes the computing device to:
   responsive to the set of older instructions downstream from the point where the error occurred issuing, proceed to process the new instruction starting with analyzing the new instruction and the tag register to determine whether the previous tag associated with the previous instruction has been stored in the tag register.

11. The computer program product of claim 9, wherein the computer readable program further causes the computing device to:
   responsive to the previous tag associated with the previous instruction failing to be stored in the tag register, store a tag corresponding to the instruction in the tag register; and
   dispatch the instruction to an issue queue for issue to the one of the plurality of execution units.

12. The computer program product of claim 8, wherein the instruction is analyzed based on at least one of a predetermined type of instruction, a predetermined type of register on which the instruction operates, a predetermined issue queue that the instruction is to be issued from when the computer program product employs multiple issue queues, or a status of a trigger in the computer program product, wherein the trigger is activated, based on at least one of whether the computer program product is running above a predetermined thermal threshold, whether the computer program product is running on battery power, or whether the computer program product is avoiding known hardware bugs that may be avoided by issuing instructions in-order and wherein the trigger is operated by at least one of software or hardware.

13. An information handling system, comprising:
   at least one out-of-order processor; and
   a memory coupled to the at least one out-of-order processor, wherein the memory comprises instructions which, when executed by the at least one out-of-order processor, cause the at least one out-of-order processor to:
   receive an instruction for dispatch to one of a plurality of execution units;
   analyze a tag register to determine whether a previous tag associated with a previous instruction has been stored in the tag register;
   responsive to the previous tag associated with the previous instruction existing in the tag register, inject a consumer into the instruction that points to the previous tag corresponding to the previous instruction;
   determine whether the instruction produces data;
   responsive to the instruction failing to produce data inject a false producer into the instruction, wherein the false producer is added for scheduling of instructions in-order in the out-of-order processor;
   store a tag corresponding to the instruction in the tag register; and
   dispatch the instruction to an issue queue for issue to the one of the plurality of execution units.

14. The information handling system of claim 13, wherein the instructions further cause the at least one out-of-order processor to:
   determine whether an error has occurred in an instruction pipeline of the information handling system;
   responsive to an error, occurring in the instruction pipeline, flush a set of instructions upstream in the instruction pipeline from a point where the error occurred;
   determine whether a new instruction has been received in the information handling system;
   responsive to the new instruction being received, determine whether a set of older instructions downstream from the point where the error occurred have issued; and
   responsive to the set of older instructions failing to have issued, wait for the set of older instructions downstream from the point where the error occurred to issue.

15. The information handling system of claim 14, wherein the instructions further cause the at least one out-of-order processor to:
   responsive to the set of older instructions downstream from the point where the error occurred issuing, proceed to process the new instruction starting with analyzing the new instruction and the tag register to determine whether the previous tag associated with the previous instruction has been stored in the tag register.

16. The information handling system of claim 14, wherein the instructions further cause the at least one out-of-order processor to:
   responsive to the previous tag associated with the previous instruction failing to be stored in the tag register, store a tag corresponding to the instruction in the tag register; and
   dispatch the instruction to an issue queue for issue to the one of the plurality of execution units.

17. The information handling system of claim 13, wherein the instruction is analyzed based on at least one of a predetermined type of instruction, a predetermined type of register on which the instruction operates, a predetermined issue queue that the instruction is to be issued from when the information handling system employs multiple issue queues, or a status of a trigger in the information handling system, wherein the trigger is activated based on at least one of whether the information handling system is running above a predetermined thermal threshold, whether the information handling system is running on battery power, or whether the information handling system is avoiding known hardware bugs that may be avoided by issuing instructions in-order and wherein the trigger is operated by at least one of software or hardware.

* * * * *